US012670634B2

(12) United States Patent
Shadaksharaiah

(10) Patent No.: US 12,670,634 B2
(45) Date of Patent: Jun. 30, 2026

(54) SYSTEMS AND METHODS FOR DISPLAYING MEDIA CONTENT TO A USER IN A VIRTUAL SETTING

(71) Applicant: Harman Becker Automotive Systems Inc., Karlsbad (DE)

(72) Inventor: Pramod Kembalalu Shadaksharaiah, Ijoor (IN)

(73) Assignee: Harman Becker Automotive Systems Inc., Novi, MI (US)

( * ) Notice: Subject to any disclaimer, the term of this patent is extended or adjusted under 35 U.S.C. 154(b) by 109 days.

(21) Appl. No.: 18/779,966

(22) Filed: Jul. 22, 2024

(65) Prior Publication Data

US 2026/0024239 A1     Jan. 22, 2026

(51) Int. Cl.
*G06T 11/00* (2006.01)
*A63F 13/65* (2014.01)
*G06F 1/16* (2006.01)
*H04N 7/18* (2006.01)

(52) U.S. Cl.
CPC .............. *G06T 11/00* (2013.01); *A63F 13/65* (2014.09); *G06F 1/163* (2013.01); *H04N 7/183* (2013.01); *A63F 2300/8082* (2013.01)

(58) Field of Classification Search
CPC ................ B60R 1/24; B60R 2300/107; B60R 2300/307; B60R 2300/802; B60R 2300/806; B60R 2300/8093; G06T 3/4038; G06V 20/58; H04N 7/181; H04N 23/698

See application file for complete search history.

(56) References Cited

U.S. PATENT DOCUMENTS

| | | | |
|---|---|---|---|
| 10,043,316 B2 | 8/2018 | Donnelly et al. | |
| 11,487,122 B1 | 11/2022 | Boone | |
| 2017/0001598 A1* | 1/2017 | Pophale | B60R 25/243 |
| 2018/0154852 A1 | 6/2018 | Thieberger et al. | |
| 2019/0193646 A1* | 6/2019 | Blaicher | H04N 7/18 |
| 2019/0379878 A1 | 12/2019 | Chapman et al. | |

OTHER PUBLICATIONS

Extended European Search Report issued in corresponding EP Application 251908117, issued Nov. 10, 2025, 10 pages.

* cited by examiner

*Primary Examiner* — Nelson M Rosario
(74) *Attorney, Agent, or Firm* — Burris Law, PLLC

(57)     ABSTRACT

A method includes the pairing of a head-mounted virtual reality device with an omnidirectional camera, the display of a converted media field to a user associated with media content corresponding to an external environment relative to a vehicle, the generation of one or more augmented-reality images, and the superimposition of the one or more augmented-reality images onto the displayed converted media file.

17 Claims, 5 Drawing Sheets

SYSTEMS AND METHODS FOR DISPLAYING MEDIA CONTENT TO A USER IN A VIRTUAL SETTING

FIELD

The present disclosure relates to a display system using a virtual reality headset, and more particularly to systems and methods for displaying a real-time video/audio feed corresponding to one or more cameras associated with a vehicle using the virtual reality headset.

BACKGROUND

The statements in this section merely provide background information related to the present disclosure and may not constitute prior art.

While vehicle designs are constantly changing, impaired vision associated with a user of the vehicle can be an inherent issue based on required components of the vehicle and limitations of glass flexibility and strength. For example, regardless of the amount and/or size of glass (e.g., windshield and window glass) on a vehicle for external viewing, occupants of the vehicle may still experience at least a somewhat impaired view resulting from the positioning of required panel components of the vehicle that are opaque or otherwise difficult to see through. Further, external noise associated with the vehicle is often inhibited due to the body of the vehicle. As such, the user of the vehicle also does not experience the external environment of the vehicle.

The present disclosure addresses these and other issues related to viewing external surroundings, particularly of from within a vehicle.

SUMMARY

This section provides a general summary of the disclosure and is not a comprehensive disclosure of its full scope or all of its features.

The present disclosure provides a system comprising: an omnidirectional camera of a vehicle configured to capture media content corresponding to an external environment relative to the vehicle; and a head-mounted virtual reality device wirelessly coupled to the omnidirectional camera, wherein the head-mounted virtual reality device is configured to: pair with the omnidirectional camera in response to a first key associated with the head-mounted virtual reality device matching a second key associated with the omnidirectional camera, and display, based on successfully pairing the head-mounted virtual reality device to the omnidirectional camera, a converted media file associated with the captured media content to a user, wherein the converted media file is displayed within a virtual reality environment of the head-mounted virtual reality device; wherein the captured media content corresponds to a real-time field of view associated with the omnidirectional camera; wherein the head-mounted virtual reality device is further configured to: switch from a first mode to a second mode, wherein the first mode is a viewing mode corresponding to the real-time field of view and the second mode is a gaming mode; wherein the captured media content includes audio associated with the external environment and video associated with the external environment; wherein the head-mounted virtual reality device is further configured to: record the displayed converted media file; wherein the head-mounted virtual reality device is further configured to: generate one or more augmented-reality images based on the external environment; and superimpose the one or more augmented-reality images onto the displayed converted media file; and wherein one or more cameras are coupled to the head-mounted virtual reality device, and wherein the head-mounted virtual reality device is further configured to: capture, via the one or more cameras, one or more components of the vehicle; display a converted media file associated with the captured one or more components of the vehicle to the user, wherein the converted media file associated with the captured one or more components of the vehicle is displayed within the virtual reality environment of the head-mounted virtual reality device; analyze one or more operational issues associated with the one or more components of the vehicle based at least in part on the displayed converted media file associated with the captured one or more components of the vehicle; generate, based on the analysis, one or more augmented-reality images associated with the operational issues; and superimpose the one or more augmented-reality images onto the displayed converted media file associated with the captured one or more components of the vehicle.

The present disclosure provides a method comprising: pairing a head-mounted virtual reality device with an omnidirectional camera in response to a first key associated with the head-mounted virtual reality device matching a second key associated with the omnidirectional camera; displaying, based on successfully pairing the head-mounted virtual reality device to the omnidirectional camera, a converted media file to a user, wherein the displayed converted media file is associated with media content corresponding to an external environment relative to a vehicle captured by the omnidirectional camera, and wherein the converted media file is displayed within a virtual reality environment of the head-mounted virtual reality device; generating one or more augmented-reality images based on the external environment; and superimposing the one or more augmented-reality images onto the displayed converted media file; wherein the captured media content corresponds to a real-time field of view associated with the omnidirectional camera; further comprising: switching from a first mode to a second mode, wherein the first mode is a viewing mode corresponding to the real-time field of view and the second mode is a gaming mode; wherein the captured media content includes audio associated with the external environment and video associated with the external environment; further comprising: recording the displayed converted media file; and further comprising: capturing one or more components of the vehicle; displaying a converted media file associated with the captured one or more components of the vehicle to the user, wherein the converted media file associated with the captured one or more components of the vehicle is displayed within the virtual reality environment of the head-mounted virtual reality device; analyzing one or more operational issues associated with the one or more components of the vehicle based at least in part on the displayed converted media file associated with the captured one or more components of the vehicle; generating, based on the analysis, one or more augmented-reality images associated with the operational issues; and superimposing the one or more augmented-reality images associated with the operational issues onto the displayed converted media file associated with the captured one or more components of the vehicle.

The present disclosure provides one or more non-transitory computer-readable media storing processor-executable instructions that, when executed by at least one processor, cause the at least one processor to: pair a head-mounted virtual reality device with an omnidirectional camera in response to a first key associated with the head-mounted virtual reality device matching a second key associated with the omnidirectional camera; and display, based on successfully pairing the head-mounted virtual reality device to the omnidirectional camera, a converted media file to a user, wherein the converted media file is associated with media content corresponding to an external environment relative to a vehicle captured by the omnidirectional camera, and wherein the converted media file is displayed within a virtual reality environment of the head-mounted virtual reality device; wherein the captured media content corresponds to a real-time field of view associated with the omnidirectional camera; wherein the at least one processor is further caused to: switch from a first mode to a second mode, wherein the first mode is a viewing mode corresponding to the real-time field of view and the second mode is a gaming mode; wherein the captured media content includes audio associated with the external environment and video associated with the external environment; wherein the at least one processor is further caused to: record the displayed converted media file; wherein the at least one processor is further caused to: generate one or more augmented-reality images based on the external environment; and superimpose the one or more augmented-reality images onto the displayed converted media file; and wherein the at least one processor is further caused to: capture one or more components of the vehicle; display a converted media file associated with the captured one or more components of the vehicle to the user, wherein the converted media file associated with the captured one or more components of the vehicle is displayed within the virtual reality environment of the head-mounted virtual reality device; analyze one or more operational issues associated with the one or more components of the vehicle based at least in part on the displayed converted media file associated with the captured one or more components of the vehicle; generate, based on the analysis, one or more augmented-reality images associated with the operational issues; and superimpose the one or more augmented-reality images onto the displayed converted media file associated with the captured one or more components of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
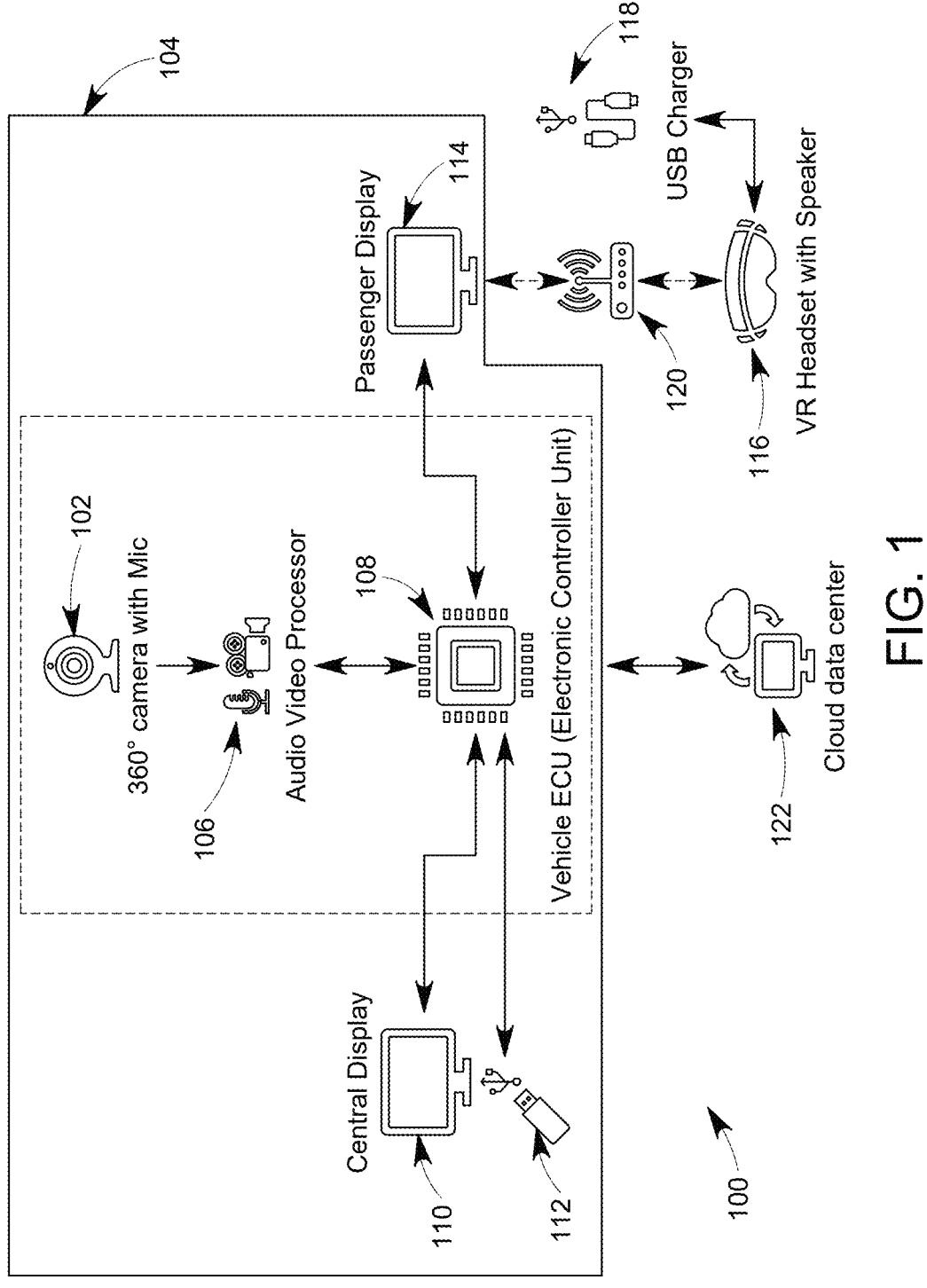
FIG. 1 is a system diagram illustrating various computer components in accordance with one or more embodiments of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more embodiments of the present disclosure provide systems and methods for displaying media content to a user of a vehicle in a 360° virtual setting. For example, due to vehicle design and/or location of the occupant(s) within the vehicle, the view by one or more occupants of the vehicle to an external environment associated with the vehicle can be limited. Moreover, unless windows of the vehicle are in a down position, the occupant(s) of the vehicle can experience limited or reduced external sounds, which can be flooded with road noise as well. The present disclosure provides a means to provide the user with a fully immersive, 360°, view of the external environment of the vehicle corresponding to a real-time view of an omnidirectional camera that allows for the user to see and/or hear the external environment of the vehicle, uninhibited, in one or more embodiments.

FIG. 1 shows a schematic diagram illustrative of a display system 100. In one or more examples, the display system 100 provides a user (not shown) with one or more media files (e.g., displayed images) that correspond to a real-time (e.g., live) field of view associated with one or more cameras 102 included as part of a vehicle 104. For example, the one or more cameras 102 may be affixed to an exterior of the vehicle 104. As another example, the one or more cameras 102 can be integrated within a body panel of the vehicle 104. As yet another example, the one or more cameras 102 can represent a plurality of surround-view cameras positioned at varying locations associated with the vehicle 104 (e.g., a front grille of the vehicle 104, a rear view mirror(s) of the vehicle 104, a tail of the vehicle 104, etc.).

The one or more cameras 102 can include one or more audio signal receivers (not shown) such as a microphone(s) or a microphone array, for example. The one or more cameras 102 are configured to capture media content such as video, image(s), audio, or a combination thereof. While the one or more cameras 102 may be comprised of a plurality of cameras, it is understood that the one or more cameras 102 may also correspond to a single 360° camera configured to capture media content in every direction. For example, the single 360° camera can be affixed to a top of the vehicle 104. However, it is understood that the 360° camera can be positioned anywhere in relation to the vehicle 104, such as integrated therein, for example.

The one or more audio signal receivers can be configured to eliminate particular sound waves (e.g., reflected sound waves) based on an algorithm. For example, the algorithm can be configured to determine a presence of any echoes, reverberations, and/or unrelated sounds associated with the incoming audio signals to ultimately remove road noise and provide the user with a sound corresponding to an external stationary environment of the vehicle 104, for example. As another example, the algorithm can cause a filtration of the audio signals, wherein the audio signals are filtered through an adaptive filter. The adaptive filter is a machine learning model in one more embodiments that is configured to dynamically learn sounds that may correspond to an echo, a reverberation, and/or unrelated sounds by comparing the incoming audio signals to a learned model, for example. As yet another example, the filtration of the audio signals can result in reduction of the echoes, reverberations, and/or unrelated sounds. However, in an instance wherein residual echoes, reverberations, and/or unrelated sounds are still present after the audio signals have been filtered, a post-processing protocol may further attenuate any remaining echoes, reverberations, and/or unrelated sounds.

The vehicle 104 also includes an audio/video processor 106, a controller 108, a central display 110, and a passenger display 114. However, it is understood that the vehicle 104 can include any other operational components related to a function of the vehicle 104. It is also understood that the vehicle 104 is not required to include each of the operational components illustrated in FIG. 1 (e.g. the one or more cameras 102, the audio/video processor 106, the controller 108, the central display 110, and the passenger display 114). It is further understood that each of the operational components (e.g. the one or more cameras 102, the audio/video processor 106, the controller 108, the central display 110, and the passenger display 114) of the vehicle 104 can be communicatively coupled via a wired or wireless means.

The audio/video processor 106 is configured to receive the media content from the one or more cameras 102. For example, the media content can be received as an uncompressed and/or unprocessed file(s) (e.g., a RAW file). As another example, the media content can be received as a plurality of individual images. In one or more embodiments, the audio/video processor 106 can include, and thereby utilize, one or more algorithms. For example, in a case wherein the media content is received as the plurality of individual images, the one or more algorithms are configured to stitch each image of the plurality of individual images to form a cohesive media file (e.g., a converted media file). For example, the cohesive media file can correspond to a video that can, but is not required to, include audio. As a further example, the audio/video processor 106 is also configured to process any format of video and/or audio files received from the one or more cameras 102.

The controller 108 (e.g., an electronic controller unit) is configured to centrally control operations of each of the operational components (e.g. the one or more cameras 102, the audio/video processor 106, the controller 108, the central display 110, and the passenger display 114) of the vehicle 104, as is illustrated in FIG. 1. For example, the controller 108 is configured to instruct the audio/video processor 106 to initiate processing of the received media content. As another example, the controller 108 is configured to also process the received media content. As a further example, the controller 108 is configured to fully process the received media content and/or initiate a post-processing method, wherein the controller 108 may make any changes to the processed media content after other processes have been completed or after playback of the media content.

The controller 108 is also configured to temporarily store media content and other media-related data therein, such as via a random access memory (RAM) for example. The controller 108, in another example, is further configured to store media content in an externally disposed database (not shown) relative to the vehicle 104 such as a read-only memory (ROM) equipped server. However, it is understood that the database may be internally disposed within the vehicle 104. The controller 108 is additionally configured to transmit the processed media content and/or one or more instructions to one or more of the operational components (e.g. the one or more cameras 102, the audio/video processor 106, the controller 108, the central display 110, and the passenger display 114) of the vehicle 104 via a communication bus.

In one or more embodiments, the controller 108 is configured to transmit the media content and/or the one or more instructions to a central display 110. For example, the central display 110 can be a display screen that delivers a combination of information and entertainment-related content and/or services to the user of the vehicle 104. As an example, the central display 110 can be integrally disposed within a dashboard of the vehicle 104. As yet another example, the central display 110 displays a 360° live feed associated with the field of view that corresponds to the one or more cameras 102. The central display 110 can be a touchscreen display that is engageable by the user, and/or other passengers of the vehicle, via a capacitive touch (e.g., with any electrically conductive object such as a finger or stylus). For example, the user can engage the central display 110 to initiate the download and/or recording of a feed of the received media content. In one or more embodiments, the controller 108 is configured to transmit the media content and/or the one or more instructions to a removable storage device 112, such as a universal serial bus (USB) drive or a secure digital (SD) card. For example, the removable storage device is used (e.g., by the user, such as an occupant of the vehicle 104) to store the received media content.

In one or more embodiments, the controller 108 is configured to transmit the media content and/or the one or more instructions to a passenger display 114. For example, the passenger display 114 can be a display screen that, similar to the central display 110, delivers a combination of information and entertainment-related content and/or services to passengers of the vehicle 104. As an example, the passenger display 114 can be adjacently located in consideration of rear passengers of the vehicle 104, such as in the roof of the vehicle 104 (e.g., a pull-down screen), within the rear of one or more headrests facing the rear passengers, and/or affixed to the rear of one or more seats facing the rear passengers. As yet another example, the passenger display 114 displays a 360° live feed associated with the field of view that corresponds to the one or more cameras 102. The passenger display 114, similar to the central display 110, can be a touchscreen display that is engageable by any of the passengers of the vehicle, via a capacitive touch. For example, any of the passengers can engage the passenger display 114 to control pairing of the passenger display 114 with the one or more cameras 102. As another example, any of the passengers can engage the passenger display 114 to also make one or more selections associated with a video, game, augmented information, or a combination thereof. As yet another example, any of the passengers can engage the passenger display 114 to also select a user profile and initiate a connection to one or more virtual reality headsets 116 from the vehicle 104.

The one or more virtual reality headsets 116 can be communicatively coupled to the passenger display 114 via a wireless means. However, it is understood that the one or more virtual reality headsets 116 can be communicatively coupled to the passenger display via a wired means. In one or more embodiments, the one or more virtual reality headsets 116 is configured to pair to the passenger display 114, and by effect, the one or more cameras 102. It is understood, however, that the one or more virtual reality headsets 116 is also configured to pair directly to the one or more cameras 102 as well. As an example, the one or more virtual reality headsets 116 can include a charging port with which a charger 118 can engage so that a battery associated with the one or more virtual reality headsets 116 can be charged. As another example, the one or more virtual reality headsets 116 can pair to the passenger display 114 via a transmission point 120 (e.g., an adapter or transmitter/receiver device). The transmission point 120 is configured to extend the communicative range of the one or more cameras 102, thereby strengthening the connection between the one or more cameras 102 and the one or more virtual reality headsets 116.

In one or more embodiments, the one or more virtual reality headsets 116 is able transmit a first security key to the passenger display 114. Upon receipt of the first security key, the passenger display 114 can forward the received first security key to the controller 108. Upon receipt of the first security key, the controller 108 is configured to authenticate the first security key therein. For example, the controller 108 can have a second security key associated with the one or more cameras 102 stored therein. The controller 108 can determine whether the first security key matches the second security key. In an instance wherein the controller 108 determines that the first security key matches the second security key, the pairing process is considered a success. As an example, the pairing process may require any additional level of security or verification processes such as, but not-limited to, the user entering a verification code that is displayed upon the passenger display 114 into the one or more virtual reality headsets 116. It is understood that any number of virtual reality headsets may be paired at the same time.

In one or more embodiments, upon the successful pairing of the one or more virtual reality headsets 116 with the one or more cameras 102, the one or more virtual reality headsets 116 is configured to provide an immersive viewing experience to the user (e.g., displaying the media content). For example, the one or more virtual reality headsets 116 can include one or more audio output transducers (not shown) that is configured to emit sound waves associated with the visual display provided by the one or more virtual reality headsets 116 to the user. As another example, the display can correspond to a real-time (e.g., live) field of view associated with the one or more cameras 102. In other words, the user is able to see and hear the entirety of the surroundings of the vehicle 104 as is seen and heard by the one or more cameras 102 in a 360° viewing experience.

In one or more further embodiments, augmented information can be provided to the one or more virtual reality headsets 116 via the controller 108. For example, the controller 108 is configured to wirelessly communicate with a cloud data center 122. As another example, the cloud data center 122 can serve as a database that stores information associated with varying locations and landmarks that may be viewed by the one or more cameras 102. For example, the cloud data center 122 may apply one or more machine learning processes to determine the location of the vehicle 104 based on a present view of the one or more cameras 102. As another example, the cloud data center 122 may utilize global positioning system (GPS) coordinates associated with the vehicle 104 and/or the present view of the one or more cameras 102 to determine the location of the vehicle 104. In one or more embodiments, the one or more virtual reality headsets 116 is configured to superimpose the augmented information on the display provided to the user on the one or more virtual reality headsets 116. In another one or more embodiments, any number of gaming-related content (e.g., video games) can also be provided to the one or more virtual reality headsets 116 via the controller 108.

In one or more embodiments, the one or more virtual reality headsets 116 is configured to provide an interactive user manual associated with the vehicle 104 to the user, via the controller 108. For example, while wearing the one or more virtual reality headsets 116, the user may direct the view associated with the one or more virtual reality headsets 116 to a component (e.g., a mechanical component or a software-related component) associated with the vehicle 104. It is understood that the one or more virtual reality headsets 116 can be coupled to a set of cameras (not shown) and that the directed view may be captured by the set of cameras. It is also understood that the set of cameras may be affixed to an external body of the one or more virtual reality headsets 116 and/or integrally incorporated therein. As another example, in response to the view of the one or more virtual reality headsets 116, the controller 108 may cause information (e.g., augmented text upon the display or audio) associated with the component to be provided to the user. As yet another example, the controller 108 may provide an overlay of the component so that any issue associated with the component may be identified. As a further example, the identified issue may be based on a logged diagnosis trouble code stored within the ROM and/or RAM-related databases. As an additional example, the controller 108 can cause the one or more virtual reality headsets 116 to provide a list of accessories to mitigate/resolve the identified issue, whether the accessories are presently located in the vehicle 104, instructions regarding how to mitigate/resolve the issue, or a combination thereof.

In one or more embodiments, the one or more virtual reality headsets 116 is also configured to provide virtual reality exposure therapy services to the user to aid in a health-related treatment such as post-traumatic stress disorder and/or anxiety. In one or more embodiments, the one or more virtual reality headsets 116 is configured to provide the user with astrology-related information, via the controller 108. For example, the astrology-related information can include an astrological view of space to the user and any information associated with the displayed astrological view. As another example, the astrology-related information can be displayed to the user based on GPS coordinates of the vehicle 104 and based on a camera and/or laser pointer affixed to the one or more virtual reality headsets 116. As a further example, augmented information associated with the astrology-related information displayed to the user can be superimposed thereupon.

In one or more embodiments, the user can switch the functionality of the one or more virtual reality headsets 116 between a gaming mode, a viewing mode, or a communication mode. For example, the gaming mode provides the user with games that may be played. As another example, the viewing mode provides the user with the 360° immersive virtual reality experience associated with the view corresponding to the real-time field of view of the one or more cameras 102. As yet another example, the communication mode can clear the displayed content from view of the user so the user may communicate with another person (e.g., a driver or another passenger) without removing the one or more virtual reality headsets 116.

Figure 2:
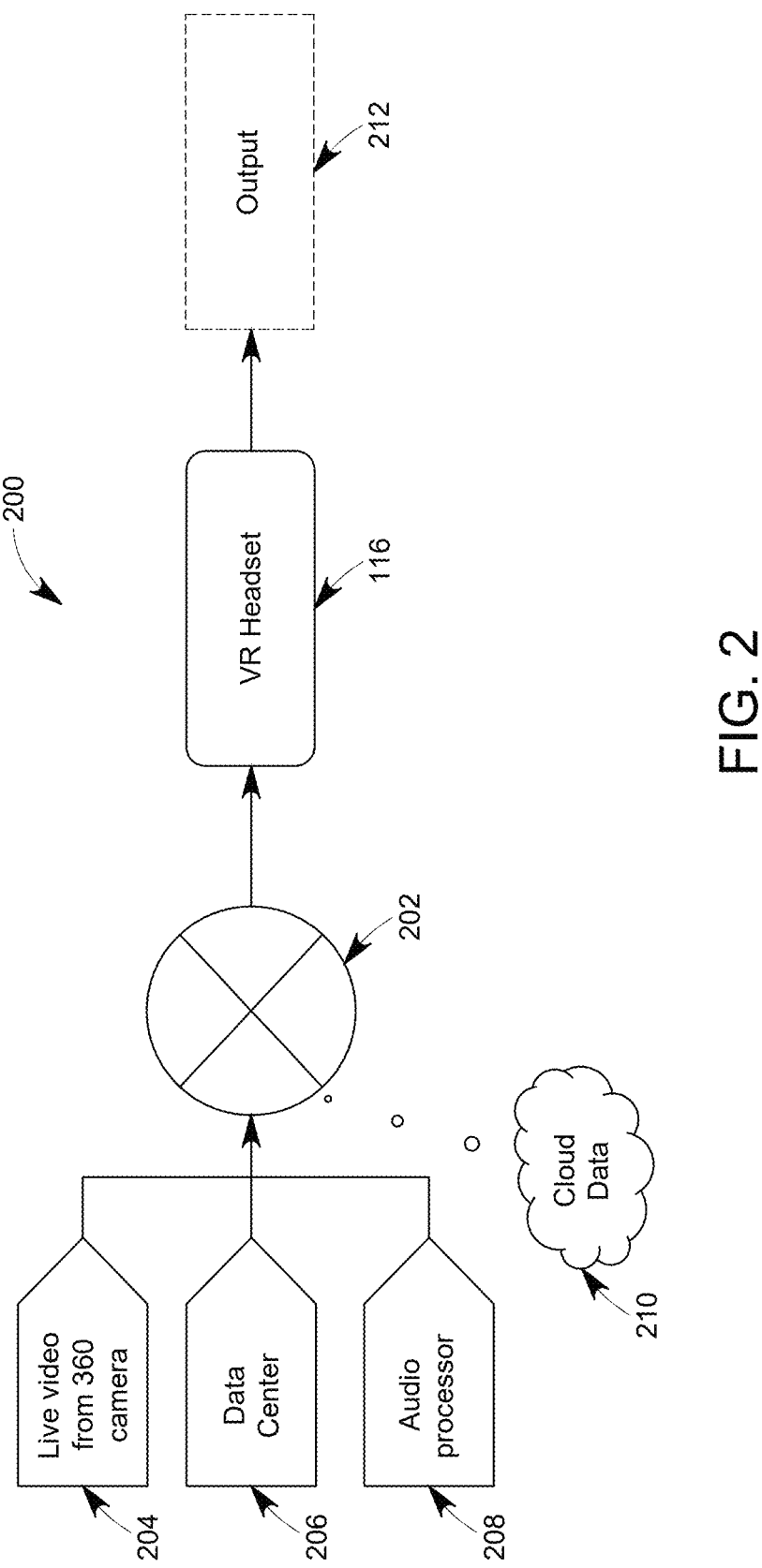
FIG. 2 is a block diagram illustrating an example process-flow associated with the system diagram of FIG. 1 and in accordance with one or more embodiments of the present disclosure.

In one or more embodiments, an example process-flow 200 associated with the provision of the display to the one or more virtual reality headsets 116 is illustrated in FIG. 2. Generally, the example process-flow 200 illustrates the processing at 202 of a video stream 204, data 206 related to the video stream, processed audio 208, and/or data 210 originating from a cloud system. For example, the processing of the video stream 204, data 206 related to the video stream, processed audio 208, and/or data 210 originating from the cloud system (collectively referred to as the "media content") can be processed by the controller 108. As another example, the video stream may be a real-time video feed transmitted from the one or more cameras 102 to the controller 108. As yet another example, the data related to the video stream may be received by the controller 108 from the externally disposed database relative to the vehicle 104. As a further example, the processed audio may be transmitted from the audio/video processor 106 to the controller 108. As an additional example, the data originating from the cloud system may be transmitted from the cloud data center 122 to the controller 108.

As is discussed herein, the controller 108 is configured to process the video stream 204, the data 206 related to the video stream, the processed audio 208, and/or the data 210 originating from the cloud system via any means including, but not limited to, one or more machine learning algorithms. Upon processing the video stream 204, the data 206 related to the video stream, the processed audio 208, and/or the data 210 originating from the cloud system the controller 108 is further configured to display the processed media content to the user via the one or more virtual reality headsets 116. For example, the display (e.g., at 212) can include video or audio media files associated with the real-time video/audio feed corresponding to the one or more cameras 102, a gaming experience, or any other media related experience (e.g., or provision).

Figure 3:
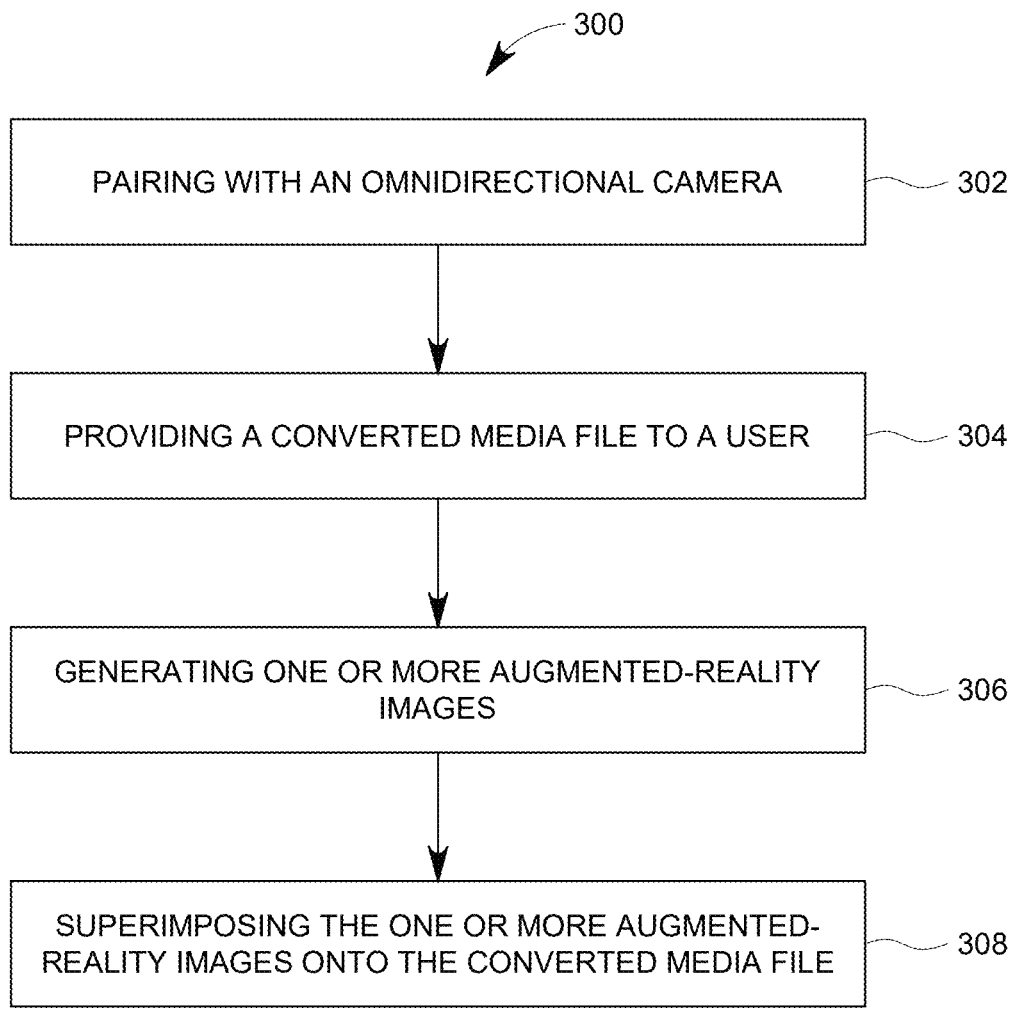
FIG. 3 is a flowchart illustrating an example method for providing a user with a display of a virtual reality environment in accordance with one or more embodiments of the present disclosure.

FIG. 3 is a flowchart illustrating an example method 300 for providing a display to a virtual reality headset that corresponds to a real-time video/audio feed originating from one or more cameras associated with a vehicle (e.g., the vehicle 104). At operation 302, a head-mounted virtual reality device (e.g., the one or more virtual reality headsets 116) is paired with an omnidirectional camera (e.g., the one or more cameras 102). For example, the head-mounted virtual reality device is paired with the omnidirectional camera in response to a first key (e.g., the first security key) associated with the head-mounted virtual reality device matching a second key (e.g., the second security key) associated with the omnidirectional camera.

At operation 304, a converted media file is displayed to a user (e.g., the user). For example, the display of the converted media file to the user is based on successfully pairing the head-mounted virtual reality device to the omnidirectional camera. As another example, the displayed converted media file is associated with media content corresponding to an external environment relative to the vehicle captured by the omnidirectional camera. As yet another example, the converted media file is displayed within a virtual reality environment of the head-mounted virtual reality device. As a further example, the captured media content corresponds to a real-time field of view associated with the omnidirectional camera. As an additional example, the captured media content includes audio associated with the external environment and/or video associated with the external environment. At operation 306, one or more augmented-reality images is generated based on the external environment. At operation 308, the one or more augmented-reality images are superimposed onto the displayed converted media file.

In one or more embodiments, a first mode is switched to a second mode. For example, the first mode is a viewing mode corresponding to the real-time field of view. As another example, the second mode is a gaming mode. In one or more embodiments, the displayed converted media file is recorded. In one or more embodiments, one or more components of the vehicle are captured (e.g., via a picture/video taking functionality of the head-mounted virtual reality device). For example, a converted media file associated with the captured one or more components of the vehicle is displayed to the user. As another example, the converted media file associated with the captured one or more components of the vehicle is displayed within the virtual reality environment of the head-mounted virtual reality device. As yet another example, one or more operational issues associated with the one or more components of the vehicle are analyzed based at least in part on the displayed converted media file associated with the captured one or more components of the vehicle. As a further example, one or more augmented-reality images associated with the operational issues are generated based on the analysis. As yet another example, the one or more augmented-reality images are superimposed onto the displayed converted media file associated with the captured one or more components of the vehicle.

Figure 4:
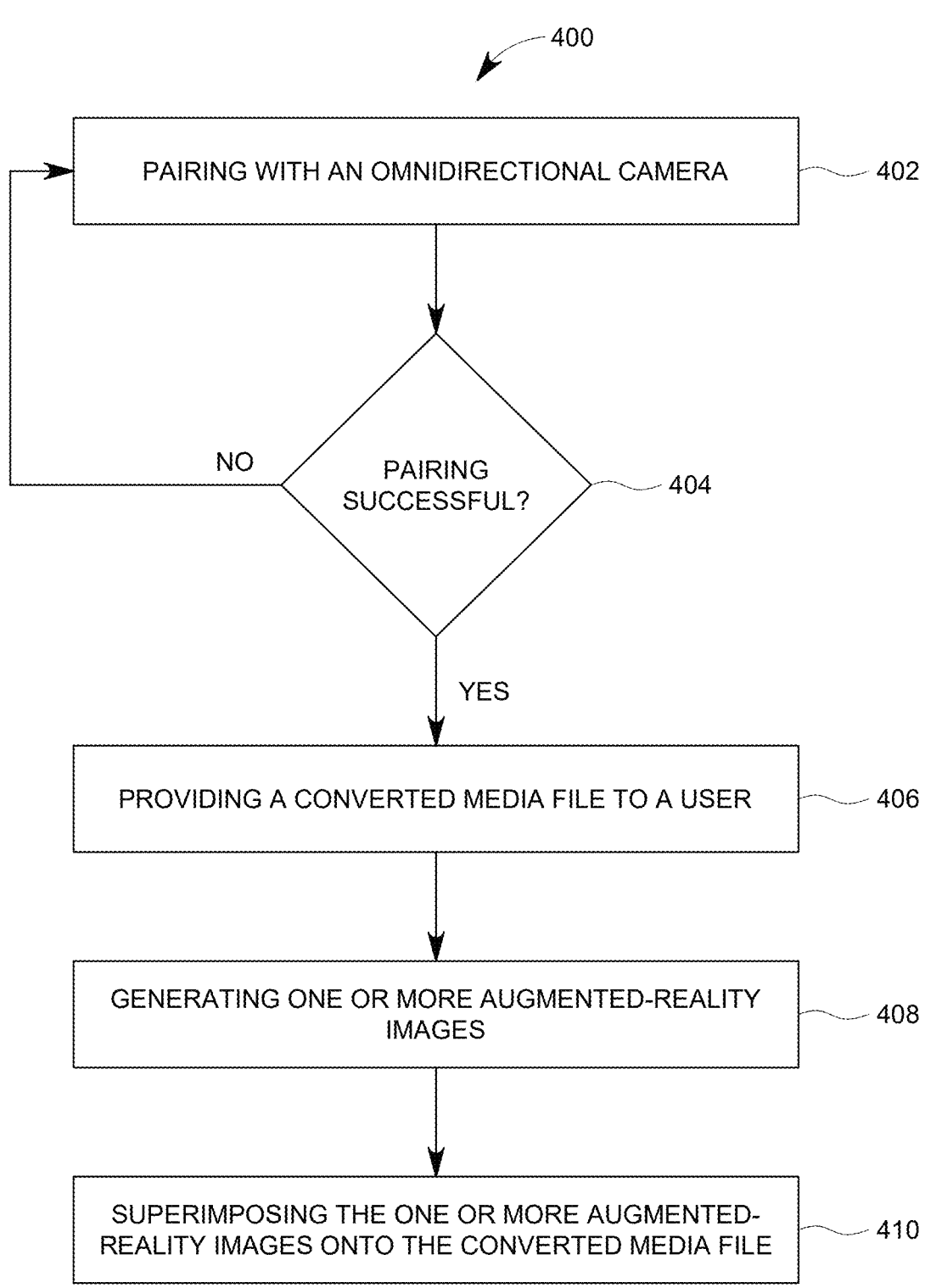
FIG. 4 is another flowchart illustrating an example method for providing a user with the display of the virtual reality environment in accordance with one or more embodiments of the present disclosure.

FIG. 4 is another flowchart illustrating an example method 400 for providing a display to a virtual reality headset that corresponds to a real-time video/audio feed originating from one or more cameras associated with a vehicle (e.g., the vehicle 104). At operation 402, a head-mounted virtual reality device (e.g., the one or more virtual reality headsets 116) is paired with an omnidirectional camera (e.g., the one or more cameras 102). At operation 404, a determination is made (e.g., such as by the controller 108) regarding whether the head-mounted virtual reality device is successfully paired with the omnidirectional camera. For example, a successful pairing of the head-mounted virtual reality device is indicated by a first key (e.g., the first security key) associated with the head-mounted virtual reality device matching a second key (e.g., the second security key) associated with the omnidirectional camera.

In an instance wherein the pairing is not successful, operation 402 is repeated and the head-mounted virtual reality device is again paired (e.g., attempted to be paired) with an omnidirectional camera. However, in an instance wherein the pairing is successful, the example method 400 proceeds to operation 406 wherein a converted media file is displayed to a user (e.g., the user). At operation 408, one or more augmented-reality images is generated and at operation 410 the one or more augmented-reality images are superimposed onto the displayed converted media file.

Figure 5:
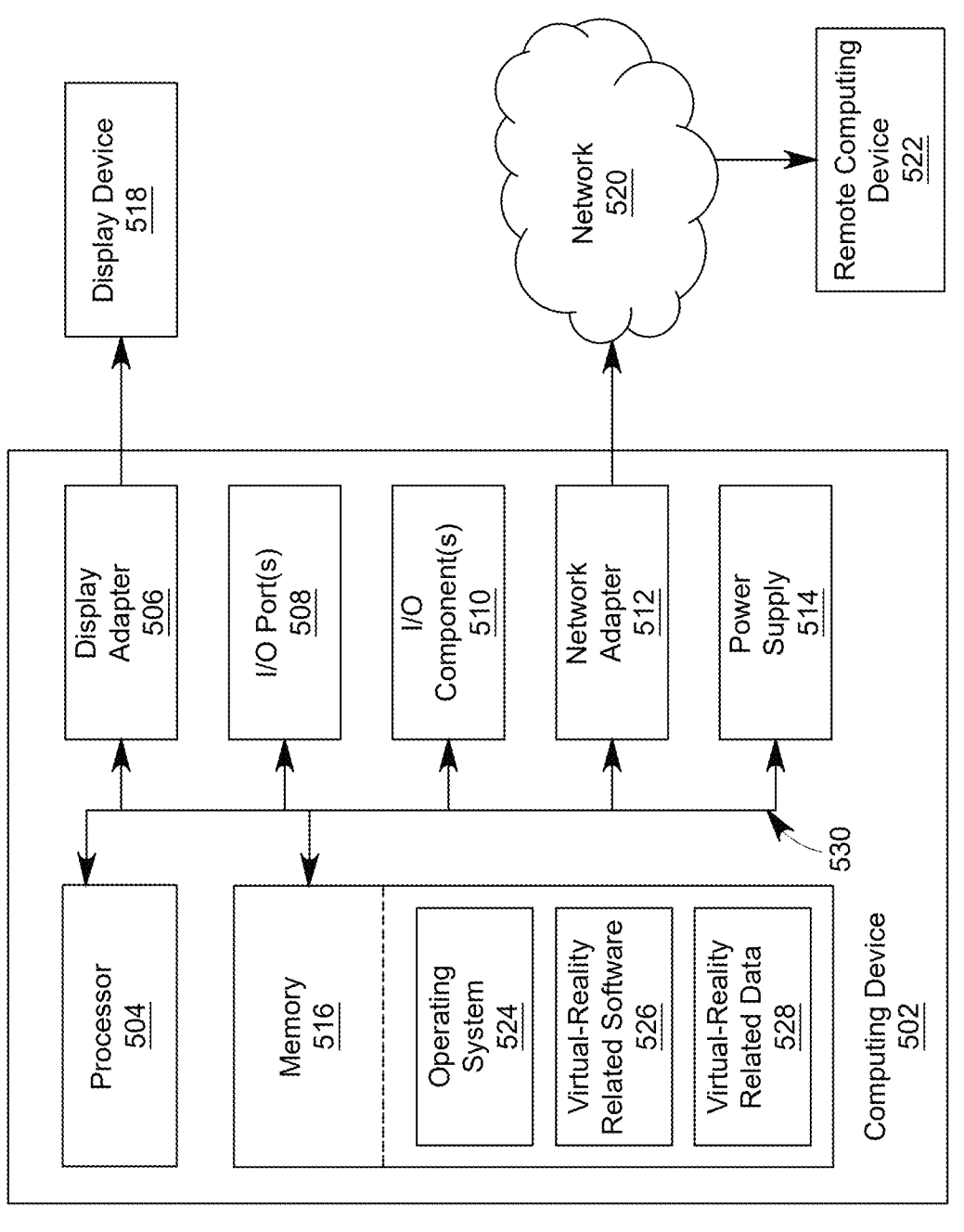
FIG. 5 is a block diagram illustrating an example computer system in accordance with one or more embodiments of the present disclosure.

FIG. 5 illustrates an operating environment that facilitates the performance of the one or more systems and methods described herein. More specifically, the systems and methods described herein can be implemented using a computing device 502. For example, the computing device 502 can be a personal computer, a desktop, a laptop, a tablet, a hand-held computer, a server, a workstation, a mainframe, a wearable computer, a supercomputer, or a combination thereof. However, it is understood that the aforementioned examples of the computing device 502 is non-exhaustive and the computing device 502 can be any type of processing or computing device. The computing device 502 generally includes a processor 504, a display adapter 506, one or more input/output port(s) 508, one or more input/output component(s) 510, a network adapter 512, a power supply 514, and a memory 516. However, it is understood that the computing device 502 can include any additional components therein and is not required to include any of the listed components (e.g., the processor 504, the display adapter 506, the one or more input/output port(s) 508, the one or more input/output component(s) 510, the network adapter 512, the power supply 514, and the memory 516).

The processor 504 is configured to provide instructions to the computing device 502 so that the computing device 502 can process one or more tasks including the implementation of a software program to perform one or more operations as described in more detail herein. It is also understood that the computing device 502 may include any number or processors 504 therein. The display adapter 506 can be a graphics card or a video board that provides the computing device 502 with a capability to display content on a display device 518 (e.g., such as described in more detail herein, for example, on a head-mounted virtual reality device). For example, the display device 518 can be any screen, monitor, and/or light-emitting component associated with any of the personal computer, the desktop, the laptop, the tablet, the hand-held computer, the server, the workstation, the mainframe, the wearable computer, the supercomputer, or a combination thereof. However, it is understood that the aforementioned examples of the display device 518 is non-exhaustive and that the display device 518 can be any type of device capable of providing a visual display.

The input/output port(s) 508 provide a number of interfaces (e.g., sockets) for one or more cables to connect to the computing device 502. It is understood that there may be any number of input/output port(s) 508 on the computing device 502. For example, the input/output port(s) 508 provides a means for the computing device 502 to receive signals and/or data from an external device connected to the computing device 502 via the one or more cables. As another example, the input/output port(s) 508 provide a means for the computing device 502 to send signals and/or data to an external device connected to the computing device 502 via the one or more cables. The input/output component(s) 510 can include one or more components that support the input/output port(s) 508 such as, but not limited to, a switch, a push button, a pressure mat, a float switch, a keypad, a radio receive, or a combination thereof.

The network adapter 512 can be any type of network interface controller that is configured to provide a means for communicating over a network 520 with another computing device, such as a remote computing device 522. For example, the remote computing device 522 can be a user device such as a cellular-phone, a smartphone, a tablet, a laptop, or a combination thereof. The power supply 514 is configured to convert alternating high voltage current (e.g., AC) into direct current (e.g., DC) to provide regulated power to the other components (e.g., the processor 504, the display adapter 506, the one or more input/output port(s) 508, the one or more input/output component(s) 510, the network adapter 512, and the memory 516) of the computing device 502.

Additionally, the memory 516 can be a mass storage device and/or a system memory such as a hard disk drive, a memory card, a solid-state drive, random access memory (RAM), or a combination thereof. The memory 516 is configured to provide storage for instructions and data associated with the operation of the computing device 502. The memory 516 can generally include an operating system 524, detection software 526, and detection data 528. For example, the operating system 524 is configured to manage and/or process any of the data and/or instructions associated with the detection software 526 and/or detection data 528, as described in more detail herein.

Furthermore, a system bus 530 is also included within the computing device 502 that is configured to couple each of the various components (e.g., the processor 504, the display adapter 506, the one or more input/output port(s) 508, the one or more input/output component(s) 510, the network adapter 512, the power supply 514, and the memory 516) of the computing device 502. It is also understood that each of the components of the computing device 502, and the functionality associated with each of the components of the computing device 502, may be implemented within the remote computing device 522. While the operating environment illustrated within FIG. 5 depicts a particular configuration associated with at least the computing device 502, the network 520, and the remote computing device 522, it is understood that the operating environment may be configured in any way.

Thus, one or more examples of the present disclosure provides a means for displaying media content to a user associated with a real-time video/audio feed corresponding to one or more cameras of a vehicle within a 360° virtual setting.

Based on the foregoing, the following provides a general overview of the present disclosure and is not a comprehensive summary. In a first one or more embodiments A1, a system comprising an omnidirectional camera of a vehicle configured to capture media content corresponding to an external environment relative to the vehicle is disclosed. The system also comprises a head-mounted virtual reality device wirelessly coupled to the omnidirectional camera, wherein the head-mounted virtual reality device is configured to pair with the omnidirectional camera in response to a first key associated with the head-mounted virtual reality device matching a second key associated with the omnidirectional camera and display, based on successfully pairing the head-mounted virtual reality device to the omnidirectional camera, a converted media file associated with the captured media content to a user, wherein the converted media file is displayed within a virtual reality environment of the head-mounted virtual reality device.

In a second one or more embodiments A2, which may include the first one or more embodiments A1, the captured media content corresponds to a real-time field of view associated with the omnidirectional camera. In a third one or more embodiments A3, which may include any combination of the first through second one or more embodiments A1-A2, the head-mounted virtual reality device is further configured to switch from a first mode to a second mode, wherein the first mode is a viewing mode corresponding to the real-time field of view and the second mode is a gaming mode. In a fourth one or more embodiments A4, which may include any combination of the first through third one or more embodiments A1-A3, the captured media content includes audio associated with the external environment and video associated with the external environment.

In a fifth one or more embodiments A5, which may include any combination of the first through fourth one or more embodiments A1-A4, the head-mounted virtual reality device is further configured to record the displayed converted media file. In a sixth one or more embodiments A6, which may include any combination of the first through fifth one or more embodiments A1-A5 the head-mounted virtual reality device is further configured to generate one or more augmented-reality images based on the external environment and superimpose the one or more augmented reality images onto the displayed converted media file. In a seventh one or more embodiments A7, which may include any combination of the first through sixth one or more embodiments A1-A6, one or more cameras are coupled to the head-mounted virtual reality device and the head-mounted virtual reality device is further configured to capture, via the one or more cameras, one or more components of the vehicle, display a converted media file associated with the captured one or more components of the vehicle to the user, wherein the converted media file associated with the captured one or more components of the vehicle is displayed within the virtual reality environment of the head-mounted virtual reality device, analyze one or more operational issues associated with the one or more components of the vehicle based at least in part on the displayed converted media file associated with the captured one or more components of the vehicle, generate, based on the analysis, one or more augmented-reality images associated with the operational issues, and superimpose the one or more augmented-reality images onto the displayed converted media file associated with the captured one or more components of the vehicle.

In an eighth one or more embodiments A8, which may include any combination of the first through seventh one or more embodiments A1-A7, a method comprising pairing a head-mounted virtual reality device with an omnidirectional camera in response to a first key associated with the head-mounted virtual reality device matching a second key associated with the omnidirectional camera is disclosed. Displaying, based on successfully pairing the head-mounted virtual reality device to the omnidirectional camera, a converted media file to a user, wherein the displayed converted media file is associated with media content corresponding to an external environment relative to a vehicle captured by the omnidirectional camera, and wherein the converted media file is displayed within a virtual reality environment of the head-mounted virtual reality device is also disclosed. Generating one or more augmented-reality images based on the external environment is additionally disclosed. Superimposing the one or more augmented-reality images onto the displayed converted media file is further disclosed.

In a ninth one or more embodiments A9, which may include any combination of the first through eighth one or more embodiments A1-A8, the captured media content corresponds to a real-time field of view associated with the omnidirectional camera. In a tenth one or more embodiments A10, which may include any combination of the first through ninth one or more embodiments A1-A9, the method further comprising switching from a first mode to a second mode, wherein the first mode is a viewing mode corresponding to the real-time field of view and the second mode is a gaming mode. In an eleventh one or more embodiments A11, which may include any combination of the first through tenth one or more embodiments A1-A10, the captured media content includes audio associated with the external environment and video associated with the external environment. In a twelfth one or more embodiments A12, which may include any combination of the first through eleventh one or more embodiments A1-A11, the method further comprising recording the displayed converted media file.

In a thirteenth one or more embodiments A13, which may include any combination of the first through twelfth one or more embodiments A1-A12, the method further comprising capturing one or more components of the vehicle, displaying a converted media file associated with the captured one or more components of the vehicle to the user, wherein the converted media file associated with the captured one or more components of the vehicle is displayed within the virtual reality environment of the head-mounted virtual reality device, analyzing one or more operational issues associated with the one or more components of the vehicle based at least in part on the displayed converted media file associated with the captured one or more components of the vehicle, generating, based on the analysis, one or more augmented-reality images associated with the operational issues, and superimposing the one or more augmented-reality images associated with the operational issues onto the displayed converted media file associated with the captured one or more components of the vehicle.

In a fourteenth one or more embodiments A14, which may include any combination of the first through thirteenth one or more embodiments A1-A13, one or more non-transitory computer-readable media storing processor-executable instructions that, when executed by at least one processor, cause the at least one processor to pair a head-mounted virtual reality device with an omnidirectional camera in response to a first key associated with the head-mounted virtual reality device matching a second key associated with the omnidirectional camera and display, based on successfully pairing the head-mounted virtual reality device to the omnidirectional camera, a converted media file to a user, wherein the converted media file is associated with media content corresponding to an external environment relative to a vehicle captured by the omnidirectional camera, and wherein the converted media file is displayed within a virtual reality environment of the head-mounted virtual reality device.

In a fifteenth one or more embodiments A15, which may include any combination of the first through fourteenth one or more embodiments A1-A14, the captured media content corresponds to a real-time field of view associated with the omnidirectional camera. In a sixteenth one or more embodiments A16, which may include any combination of the first through fifteenth one or more embodiments A1-A15, the at least one processor is further caused to switch from a first mode to a second mode, wherein the first mode is a viewing mode corresponding to the real-time field of view and the second mode is a gaming mode. In a seventeenth one or more embodiments A17, which may include any combination of the first through sixteenth one or more embodiments A1-A16, the captured media content includes audio associated with the external environment and video associated with the external environment.

In an eighteenth one or more embodiments A18, which may include any combination of the first through seventeenth one or more embodiments A1-A17, wherein the at least one processor is further caused to record the displayed converted media file. In a nineteenth one or more embodiments A19, which may include any combination of the first through eighteenth one or more embodiments A1-A18, the at least one processor is further caused to generate one or more augmented-reality images based on the external environment and superimpose the one or more augmented-reality images onto the displayed converted media file. In a twentieth one or more embodiments A20, which may include any combination of the first through nineteenth one or more embodiments A1-19, the at least one processor is further caused to capture one or more components of the vehicle display a converted media file associated with the captured one or more components of the vehicle to the user, wherein the converted media file associated with the captured one or more components of the vehicle is displayed within the virtual reality environment of the head-mounted virtual reality device, analyze one or more operational issues associated with the one or more components of the vehicle based at least in part on the displayed converted media file associated with the captured one or more components of the vehicle, generate, based on the analysis, one or more augmented-reality images associated with the operational issues, and superimpose the one or more augmented-reality images onto the displayed converted media file associated with the captured one or more components of the vehicle.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed ana- log/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described function- ality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tan- gible computer-readable medium are nonvolatile memory circuits (such as a flash memory circuit, an erasable pro- grammable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose com- puter to execute one or more particular functions embodied in computer programs. The functional blocks, flowchart components, and other elements described above serve as software specifications, which can be translated into the computer programs by the routine work of a skilled techni- cian or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   pairing a head-mounted virtual reality device with an omnidirectional camera in response to a first key asso- ciated with the head-mounted virtual reality device matching a second key associated with the omnidirec- tional camera;

displaying, based on successfully pairing the head- mounted virtual reality device to the omnidirectional camera, a converted media file to a user, wherein the displayed converted media file is associated with media content corresponding to one or more components of a vehicle captured by the omnidirectional camera, and wherein the converted media file is displayed within a virtual reality environment of the head-mounted virtual reality device;

analyzing one or more operational issues associated with the one or more components of the vehicle based at least in part on the displayed converted media file;

generating one or more augmented-reality images asso- ciated with the one or more operational issues; and superimposing the one or more augmented-reality images onto the displayed converted media file.

2. The method of claim 1, wherein the captured media content corresponds to a real-time field of view associated with the omnidirectional camera.

3. The method of claim 2, further comprising:
   switching from a first mode to a second mode, wherein the first mode is a viewing mode corresponding to the real-time field of view and the second mode is a gaming mode.

4. The method of claim 1, wherein the captured media content includes audio associated with an external environ- ment and video associated with the external environment.

5. The method of claim 1, further comprising:
   recording the displayed converted media file.

6. One or more non-transitory computer-readable media storing processor-executable instructions that, when executed by at least one processor, cause the at least one processor to:
   pair a head-mounted virtual reality device with an omni- directional camera in response to a first key associated with the head-mounted virtual reality device matching a second key associated with the omnidirectional cam- era;

display, based on successfully pairing the head-mounted virtual reality device to the omnidirectional camera, a converted media file to a user, wherein the converted media file is associated with media content correspond- ing to one or more components of a vehicle captured by the omnidirectional camera, and wherein the converted media file is displayed within a virtual reality environ- ment of the head-mounted virtual reality device;

analyze one or more operational issues associated with the one or more components of the vehicle based at least in part on the displayed converted media file;

generate one or more augmented-reality images associ- ated with the one or more operational issues; and superimpose the one or more augmented-reality images onto the displayed converted media file.

7. The one or more non-transitory computer-readable media of claim 6, wherein the captured media content corresponds to a real-time field of view associated with the omnidirectional camera.

8. The one or more non-transitory computer-readable media of claim 7, wherein the at least one processor is further caused to:
   switch from a first mode to a second mode, wherein the first mode is a viewing mode corresponding to the real-time field of view and the second mode is a gaming mode.

9. The one or more non-transitory computer-readable media of claim 6, wherein the captured media content includes audio associated with an external environment and video associated with the external environment.

10. The one or more non-transitory computer-readable media of claim 6, wherein the at least one processor is further caused to:

record the displayed converted media file.

11. The one or more non-transitory computer-readable media of claim 6, wherein the at least one processor is further caused to:

generate one or more second augmented-reality images based on an external environment; and superimpose the one or more second augmented-reality images onto the displayed converted media file.

12. One or more non-transitory computer-readable media storing processor-executable instructions that, when executed by at least one processor, cause the at least one processor to:

pair a head-mounted virtual reality device with an omnidirectional camera;

display, using the head-mounted virtual reality device, a converted media that is associated with media content corresponding to one or more components of a vehicle captured by the omnidirectional camera;

analyze one or more operational issues associated with the one or more components of the vehicle based at least in part on the converted media file;

generate one or more augmented-reality images associated with the one or more operational issues; and

superimpose the one or more augmented-reality images onto the converted media file.

13. The one or more non-transitory computer-readable media of claim 12, wherein the captured media content corresponds to a real-time field of view associated with the omnidirectional camera.

14. The one or more non-transitory computer-readable media of claim 13, wherein the at least one processor is further caused to switch from a first mode to a second mode, wherein the first mode is a viewing mode corresponding to the real-time field of view and the second mode is a gaming mode.

15. The one or more non-transitory computer-readable media of claim 6, wherein the captured media content includes audio associated with an external environment and video associated with the external environment.

16. The one or more non-transitory computer-readable media of claim 12, wherein the at least one processor is further caused to record the converted media file.

17. The one or more non-transitory computer-readable media of claim 6, wherein the at least one processor is further caused to:

generate one or more second augmented-reality images based on an external environment; and superimpose the one or more second augmented-reality images onto the converted media file.

* * * * *